INVENTOR.
Albert G Bodine Jr.
BY Forrest J. Lilly
Attorney

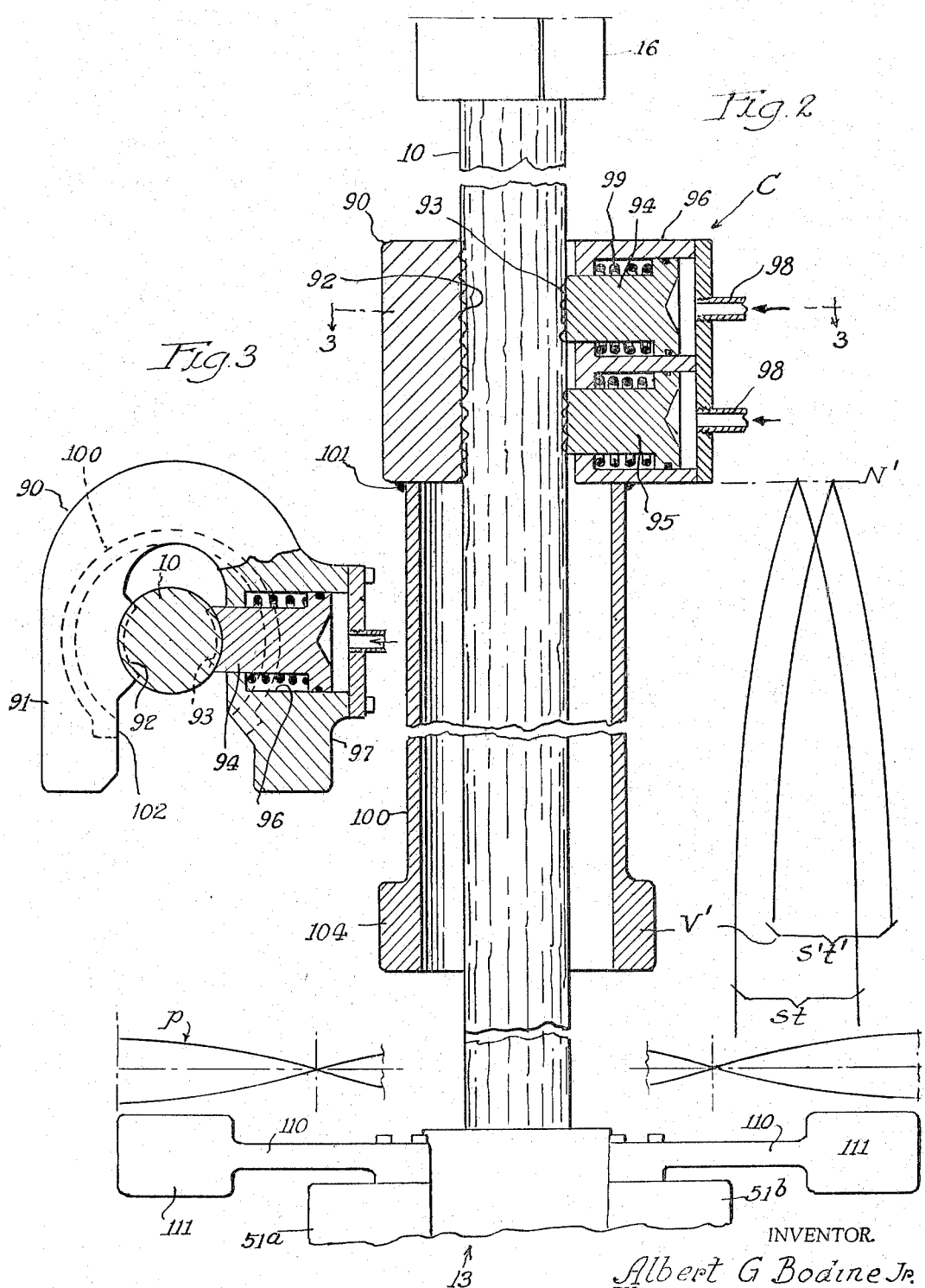

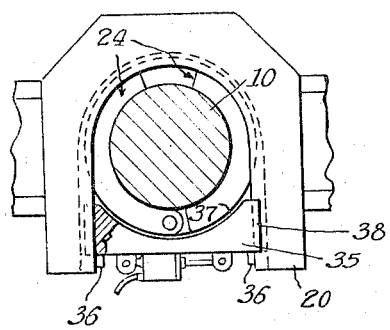
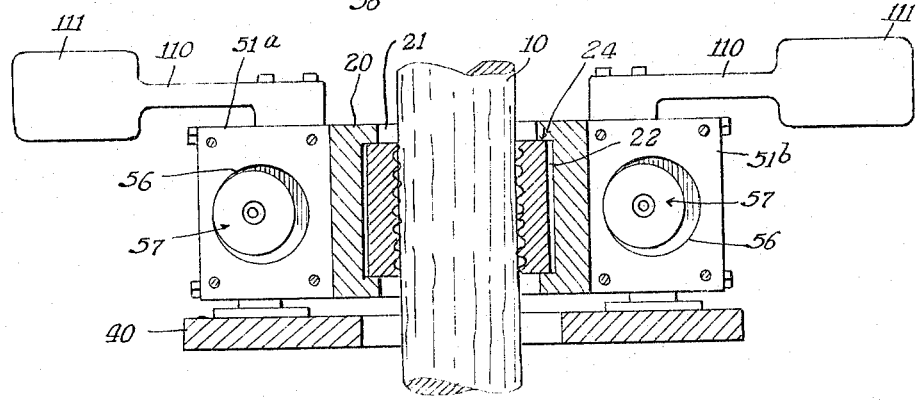
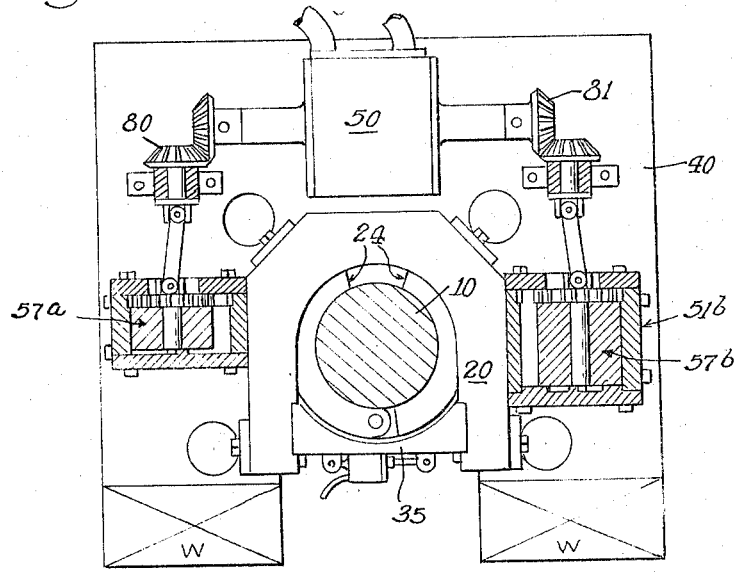

United States Patent Office 3,289,774
Patented Dec. 6, 1966

3,289,774
VIBRATION ISOLATOR FOR SONIC POLE
DRIVING SYSTEM
Albert G. Bodine, Jr., Los Angeles, Calif.
(7877 Woodley Ave., Van Nuys, Calif.)
Filed July 14, 1965, Ser. No. 471,888
14 Claims. (Cl. 175—19)

This invention relates generally to sonic systems for planting utility poles in the ground, such as power line and telephone poles, without first digging a hole therefor, utilizing certain sonic vibratory procedures and apparatus, and deals with subject matter disclosed in part in my prior and copending application entitled Sonic Wave System for Planting Utility Poles in the Ground, Ser. No. 228,085, filed Oct. 3, 1962, now Patent No. 3,199,614, of which the instant application is a continuation-in-part.

According to the basic sonic process used, and as disclosed and claimed in my said prior application, the elastic property of the utility pole, be it constructed of wood, steel, or other elastic material, is availed of and a sonic elastic standing wave pattern is set up therein, with a velocity antinode at the lower end of the pole, and a stress antinode (velocity node) higher up therealong. To obtain this wave pattern, a mechanical sonic wave generator or oscillator is clamped, by use of a rugged pole clamp, to the pole at a position below the stress antinode, and, of course, is spaced above the point on the pole which is to be driven to ground level. The body mass of the sonic wave generator clamped to the pole imposes a downward bias force thereon, and, when the lower end of the pole is allowed to rest against the ground, with this bias force in effect, and with the elastic or sonic wave pattern developed by operation of the generator, the pole buries itself into the ground, all as discussed fully in my aforesaid application Ser. No. 228,085.

With the elementary system briefly described in the preceding paragraph, the standing wave normally extends to the top end of the pole, subjecting cross-arms, brackets, insulators and the like to considerable undesirable vibration, which can be of sufficiently severe intensity as to damage these parts. This is particularly so when driving in fairly firm soils, where the vibratory action must be sustained for an appreciable time interval. Of course, there is no problem when a bare pole is to be driven, or where the ground is not too firm.

Accordingly, it is a primary object of the present invention to incorporate in this sonic pole driving system a feature for effectively sonically isolating the upper portion of the pole from the vibratory action in the lower portion thereof, such that the upper end portion of the pole bearing the cross-arms and other equipment remains relatively quiescent. With this improvement, it even becomes possible, for the first time, to relocate a utility pole, such as in a street widening operation, by sonically extracting the pole (by reversing the driving process such as by pulling up), moving it over a few feet, and then sonically redriving it into the ground, all with the upper end structure, and in some cases even the electric lines, still remaining connected.

Before entering upon a description of the present invention, reference is directed to the latter portion of this introduction to the specification, entitled Sonic Discussion, which includes a description of certain sonic phenomena necessary to a full appreciation of the invention, and also includes definitions of certain sonic expressions which will presently be used in disclosing the invention.

The present invention, as stated above, is concerned with a sonic means for obtaining isolation of the upper portion of the pole from the vibration in the lower portion thereof. The preferred practice of the invention is to establish a discrete sonic elastic vibration circuit involving the lower portion of the pole, and not the upper portion thereof, including a sonic means for maintaining a definite sonic node function (stress antinode) near the upper end of a lower portion of the pole, and with the frequency of the vibrations in the lower portion of the pole so adjusted that said lower portion vibrates in a resonant standing wave pattern, while the relative lengths of the lower and upper portions of the pole are adjusted so that no frequency is developed which will resonate the upper portion of the pole. Otherwise described, the invention resides in temporarily attaching certain auxiliary sonic circuit structure, as a "secondary circuit element," to an intermediate point along the pole, so as to coact with the portion of the pole therebelow in completion of a sonic vibratory circuit, operable in a resonant standing wave pattern, substantially independently of the portion of the pole above. There is then no reason for the pole to demand any type of reactive impedance from the portion of the pole above the point of attachment of this "secondary sonic circuit element," with the result that the upper portion of the pole remains quiescent.

A simple and elementary form of the secondary circuit element is a mass element, or mass reactance element, comprised simply of a large and massive part clamped tightly to the pole, so as to present a very high mass reactance, i.e. a highly mass-reactive impedance, which tends to provide a nodal region just adjacent or below it, typically near the center of gravity of the mass element and lower pole portion. The standing wave pattern is then confined almost wholly to the lower portion of the pole below this mass element, which acts as an isolator, with vibration thereabove very materially reduced. The mass reactance is made relatively high, relative to the impedance of the pole itself, so that the node created by the mass element, for the resonant standing wave pattern in a lower portion of the pole, is right up close to this mass element. It can be seen that this mass element, particularly if used alone, must necessarily be of quite large mass, because the nodal region even of a wooden utility pole is inclined to be of fairly high impedance. Thus, to maintain the node very close to the mass element, the mass element has to be quite large or heavy. In any event, by this improvement, it is possible to very greatly reduce the vibration of the pole at and above this mass, and of any pole-mounted structure thereabove. It should also be observed that when this modification of the basic system is employed, the length of the standing wave pattern has no relation to the overall length of the pole, since the standing wave pattern does not extend throughout the length of the pole. Instead, a wave pattern is set up in a predetermined lower portion length of the pole. The lower end portion of the pole, up to the location of the mass element, thus contains, ordinarily, the entirety of whatever standing wave pattern is set up in the pole.

A further improvement and advantage resides in clamping the heavy mass element fairly high on the pole, preferably at a region considerably above the center of length of the pole, so that the portion of the pole above the mass tunes at a much higher frequency than the portion of the pole below this mass. This provision further insures that there will not be any accidental tuning of the portion of the pole above the mass to the frequency of the standing wave set up in the lower portion of the pole, such as may permit the upper portion of the pole to couple in to an extent and thus be set into a material degree of unwanted vibration.

A further feature of the invention, optional but preferred, and of very considerable advantage, is to attach to the above described mass element, as an added secondary sonic circuit element, an elastically vibratory structure typically characterized by a degree of distributed mass and compliance, which is tuned to the same frequency as the lower portion of the pole which it is desired to resonate, i.e. to vibrate in a single over-all resonant standing wave pattern with said lower portion of the hole. This elastically vibratory structure may be, for example, a tubular jacket of elastic material extending down from the mass element, optionally with a lumped mass at the lower end, and tuned to vibrate at the resonant vibration frequency of the lower portion of the pole, and also 180° out of phase with respect to the latter. The resonant acoustic circuit thus includes the lower portion of the pole, the clamp, any mass element effect at the clamp, and this additional elastically vibratory resonant structure with vibrates out of phase with the lower portion of the pole, the entire circuit vibrating at resonance. The added elastically vibratory structure thus provides a "bucking impedance" where it is attached to the clamp which attaches the elastically vibratory structure to the pole. In effect, the elastically vibratory structure is able to function as though there were an extremely large mass at the clamp, and by this means, an even higher impedance can thus be located at the clamp, or in the clamped region of the pole, than could be accomplished by any practical sized lumped mass. Since the effects of a lumped mass element located at the clamp, and the elastically vibratory structure which vibrates out of phase with the lower portion of the pole, are additive, it is advantageous and a preferred feature of the invention to use the mass element and the out-of-phase elastically vibratory structure in coacting and mutually aiding combination. It should be understood, however, that if a sufficiently large mass element were to be used, theoretically and ideally an infinite mass, there would be no need for the additional out-of-phase elastically vibratory structure. Also, in the other direction, the mass element might be reduced more and more in mass and the out-of-phase elastically vibratory structure designed to correspondingly accept more and more of the bucking impedance function. At the extreme in this direction, in order to have complete bucking and virtually complete quiescence in the upper portion of the pole, the elastically vibratory structure added on at the clamp must vibrate resonantly with the pole portion below the clamp, 180° out of phase therewith, and with an effective momentum which at every given instant is equal and opposite to that of the lower vibratory portion of the pole.

A still further feature of the invention, in further aid of the objective of the invention, comprises a tuned laterally vibratory resonant reed, of robust size, attached to the oscillator or vibration generator which is the source of the vibrations used in the system. This oscillator is, as understood, clamped to the lower portion of the pole at a selected point therealong, and it will be understood that the oscillator body has a substantial mass, which must be vibrated, along with the pole, with the penalty of consumption of a substantiall proportion of the otherwise available output force from the oscillator. The resonant reed is tuned to the resonant frequency at which the oscillator operates, and adds to the sonic circuit an amount of elastic compliance reactance which tunes out or cancels the mass reactance of the oscillator body at the frequency of the resonant standing wave pattern set up in the pole. This then lowers the reactive impedance of the resonating part of the pole, which would otherwise include the mass reactive impedance of the oscillator body mass. By so lowering the mass reactive impedance of the pole, the demands upon the above described vibration isolation devices are materially reduced. Expressed differently, it can be said that the mass of the oscillator body, if it were not tuned out, would tend to "pull down" the location of the node which is otherwise desirably located up as close as possible to the earlier described secondary sonic circuit elements comprised of the isolating mass and/ or out-of-phase elastically vibratory structure attached on by the clamp.

The practice of the invention facilities and enables the extraction and the driving of utility poles and the like, while confining the elastic vibratory action within a localized region of the pole which is not bothered or subject to damage by such vibration. An additional advantage is that by confining the elastically vibratory action to a sonic circuit of such simplicity, with minimization of frictional damping, a high acoustic Q is attained, with resulting high performance. In other words, with vibratory action at the top, the various cross-arms and other hardware act in such a way as to damp out some of the sonic energy, if this extraneous structure participates in very much of the vibratory performance. On the other hand, by maintaining the upper end portion of the pole in a virtually or substantially quiescent condition, damping from this source is much reduced, and high Q performance correspondingly promoted.

An additional feature and performance of the invention is that, by confining the vibratory action within the pole to a particular longitudinal length, or in other words, by the location of the nodal point always at a predetermined distance from the bottom end of the pole, accomplished of course by always locating the nodal mass, or the out-of-phase vibratory structure, at a predetermined elevation above the lower end of the pole, it is possible to establish a single predetermined resonant frequency for a wide range of pole sizes. This is a considerable advantage, because the sonic oscillator can then be designed to work in a fairly narrow frequency range, and therefore be of optimum efficiency, even though the oscillator is applied to a wide variety of over-all pole lengths.

SONIC DISCUSSION

Certain acoustic phenomena disclosed in the foregoing and hereinafter, are, generally speaking, outside the experience of those skilled in the acoustics art. To aid in a full understanding of these phenomena by those skilled in the acoustics art, and by others, the following general discussion, including definition of terms, is deemed to be of importance.

By the expression "sonic vibration" I mean elastic vibrations, i.e. cyclic elastic deformations, which travel through a medium with a characteristic velocity of propagation. If these vibrations travel longitudinally, or create a longitudinal wave pattern in a medium or structure having uniformly distributed constants of elasticity or modulus, and mass, this is sound wave transmission. Regardless of the vibratory frequency of such sound wave transmission, the same mathematical formulae apply, and the science is called sonics. In addition, there can be elastically vibratory systems wherein the essential features of mass appear as a localized influence or parameter, known as a "lumped constant"; and another such lumped constant can be a localized or concentrated elastically deformable element, affording a local effect referred to variously as elasticity, modulus, modulus of elasticity, stiffness, stiffness modulus, or compliance, which is the reciprocal of the stiffness modulus. Fortunately, these constants, when functioning in an elastically vibratory system such as mine, have cooperating and mutually influencing effects like equivalent factors in alternating-current electrical systems. In fact, in both distributed and lumped constant systems, mass is mathematically equivalent to inductance (a coil); elastic compliance is mathematically equivalent to capacitance (a condensor); and friction or other pure energy dissipation is mathematically equivalent to resistance (a resistor).

Because of these equivalents, my elastic vibratory systems with their mass and stiffness and energy consumption, and their sonic energy transmission properties, can be viewed as equivalent electrical circuits, where the functions can be expressed, considered, changed and quantitatively analyzed by using well proven electrical formulae.

It is important to recognize that the transmission of sonic energy into the interface or work area between two parts to be moved against one another requires the above mentioned elastic vibration phenomena in order to accomplish the benefits of my invention. There have been other proposals involving exclusively simple bodily vibration of some part. However, these latter do not result in the benefits of my sonic or elastically vibratory action.

Since sonic or elastic vibration results in the mass and elastic compliance elements of the system taking on these special properties akin to the parameters of inductance and capacitance in alternating current phenomena, wholly new performances can be made to take place in the mechanical arts. The concept of acoustic impedance becomes of paramount importance in understanding performances. Here impedance is the ratio of cyclic force or pressure acting in the media to resulting cyclic velocity or motion, just like the ratio of voltage to current. In this sonic adaptation impedance is also equal to media density times the speed of propagation of the elastic vibration.

In this invention impedance is important to the accomplishment of desired ends, such as where there is an interface. A sonic vibration transmitted across an interface between two media or two structures can experience some reflection, depending upon differences of impedance. This can cause large relative motion, if desired, at the interface.

Impedance is also important to consider if optimized energization of a system is desired. If the impedances are adjusted to be matched somewhat, energy transmission is made very effective.

Sonic energy at fairly high frequency can have energy effects on molecular or crystalline systems. Also, these fairly high frequencies can result in very high periodic acceleration values, typically of the order of hundreds or thousands of times the acceleration of gravity. This is because mathematically acceleration varies with the square of frequency. Accordingly, by taking advantage of this square function, I can accomplish very high forces with my sonic systems. My sonic systems preferably accomplish such high forces, and high total energy, by using a type of sonic vibration generator taught in my Patent No. 2,960,314, which is a simple mechanical device. The use of this type of sonic vibration generator in the sonic system of the present invention affords an especially simple, reliable, and commercially feasible system.

An additional important feature of these sonic circuits is the fact that they can be made very active, so as to handle substantial power, by providing a high "Q" factor. Here this factor Q is the ratio of energy stored to energy dissipated per cycle. In other words, with a high Q factor, the sonic system can store a high level of sonic energy, to which a constant input and output of energy is respectively added and subtracted. Circuitwise, this Q factor is numerically the ratio of inductive reactance to resistance. Moreover, a high Q system is dynamically active, giving considerable cyclic motion where such motion is needed.

Certain definitions should now be given:

Impedance, in an elastically vibratory system, is, mathematically, the complex quotient of applied alternating force and linear velocity. It is analogous to electrical impedance. The concise mathematical expression for this impedance is $$Z = R + \sqrt{-1}\left(2\pi f M - \frac{1}{2\pi f C}\right)$$

where M is vibratory mass, C is elastic compliance (the reciprocal of stiffness, or of modulus of elasticity) and $f$ is the vibration frequency.

Resistance is the "real" part R of the impedance, and represents energy dissipation, as by friction.

Reactance is the "imaginary" part of the impedance, and is the difference of mass reactance and compliance reactance.

Mass reactance is the positive imaginary part of the impedance, given by $2\pi f M$. It is analogous to electrical inductive reactance, just as mass is analogous to inductance.

Elastic compliance reactance is the negative imaginary part of impedance, given by $1/2\pi f C$. Elastic compliance reactance is analogous to electrical capacitative reactance, just as compliance is analogous to capacitance.

Resonance in the vibratory circuit is obtained at the operating frequency at which the reactance (the algebraic sum of mass and compliance reactances) becomes zero. Vibration amplitude is limited under this condition to resistance alone, and is maximized. The inertia of the mass elements necessary to be vibrated does not under this condition consume any of the driving force.

A valuable feature of my sonic circuit is the provision of enough extra elastic compliance reactance so that the mass or inertia of various necessary bodies in the system does not cause the system to depart so far from resonance that a large proportion of the driving force is consumed and wasted in vibrating this mass. For example, a mechanical oscillator or vibration generator of the type normally used in my inventions always has a body, or carrying structure, for containing the cyclic force generating means. This supporting structure, even when minimal, still has mass, or inertia. This inertia could be a force-wasting detriment, acting as a blocking impedance using up part of the periodic force output just to accelerate and decelerate this supporting structure. However, by use of elastically vibratory structure in the system, the effect of this mass, or the mass reactance resulting therefrom, is counteracted at the frequency for resonance; and when a resonant acoustic circuit is thus used, with adequate capacitance (elastic compliance reactance), these blocking impedances are tuned out of existence, at resonance, and the periodic force generating means can thus deliver its full impulse to the "work," which is the resistive component of the impedance.

Sometimes it is especially beneficial to couple the sonic oscillator at a low-impedance (high-velocity vibration) region, for optimum power input, and then have high impedance (high-force vibration) at the work point. The sonic circuit is then functioning additionally as a transformer, or acoustic lever, to optimize the effectiveness of both the oscillator region and the work delivering region.

For very high-impedance systems having high Q at high frequency, I sometimes prefer that the resonant elastic system be a bar of solid material such as steel. For lower frequency or lower impedance, especially where large amplitude vibration is desired, I use a fluid resonator. One desirable specie of my invention employs, as the source of sonic power, a sonic resonant system comprising an elastic member in combination with an orbiting mass oscillator or vibration generator, as above mentioned. This combination has many unique and desirable features. For example, this orbiting mass oscillator has the ability to adjust its input power and phase to the resonant system so as to accommodate changes in the work load, including changes in either or both the reactive impedance and the resistive impedance. This is a very desirable feature in that the oscillator "hangs on" to the load even as the load changes.

It is important to note that this unique advantage of the orbiting mass oscillator accrues from the combination thereof with the acoustic resonant circuit, so as to comprise a complete acoustic system. In other words, the orbiting mass oscillator is matched up to the resonant part of its system, and the combined system is matched up to the acoustic load, or the job to be accomplished. One manifestation of this proper matching is a characteristic whereby the orbiting mass oscillator tends to "lock in" to the resonant frequency of the resonant part of the system.

The combined system has a unique performance which is exhibited in the form of a greater effectiveness and particularly greater persistence in a sustained sonic action as the work process proceeds or goes through phases and changes of conditions. The orbiting mass oscillator, in this matched-up arrangement, is able to hang on to the load and continue to develop power as the sonic energy absorbing environment changes with the variations in sonic energy absorption by the load. The orbiting mass oscillator automatically changes its phase angle, and therefore its power factor, with these changes in the resistive impedance of the load.

A further important characteristic which tends to make the orbiting mass oscillator hang on to the load and continue the development of effective power, is that it also accommodates for changes in the reactive impedance of the acoustic environment while the work process continues. For example, if the load tends to add either inductance or capacitance to the sonic system, then the orbiting mass oscillator will accommodate accordingly. Very often this is accommodated by an automatic shift in frequency of operation of the orbiting mass oscillator by virtue of an automatic feedback of torque to the energy source which drives the orbiting mass oscillator. In other words, if the reactive impedance of the load changes this automatically causes a shift in the resonant response of the resonant circuit portion of the complete sonic system. This in turn causes a shift in the frequency of the orbiting mass oscillator for a given torque load provided by the power source which drives the orbiting mass ocsillator.

All of the above mentioned characteristics of the orbiting mass oscillator are provided to a unique degree by this oscillator in combination with the resonant circuit. As explained elsewhere in this discussion the kinds of acoustic environment presented to the sonic source by this invention are uniquely accommodated by the combination of the orbiting mass oscillator and the resonant system. As will be noted, this invention involves the application of sonic power which brings forth some special problems unique to this invention, which problems are primarily a matter of delivering effective sonic energy to the particular work process involved in this invention. The work process, as explained elsewhere herein, presents a special combination of resistive and reactive impedances. These circuit values must be properly met in order that the invention be practiced effectively.

The invention will be further understood by referring now to the following detailed description of one illustrative embodiment thereof, reference for this purpose being had to the accompanying drawings, in which:

FIG. 2 is an enlarged view similar to a portion of FIG. 1, with portions of the equipment broken away medially along a vertical section line, and showing diagrammatically a modified standing wave diagram resulting from a use of a more dominating elastically vibratory impedance bucking structure;

FIG. 3 is a section taken on line 3—3 of FIG. 2;

FIG. 7 is a view similar to a portion of FIG. 4, showing the addition of a closure block;

FIG. 8 is a view similar to FIG. 4, but showing a modification in the phase relationship of the rotors of the wave generating means or oscillator; and FIG. 9 is a view similar to FIG. 4, but showing a modification.

Figure 1:
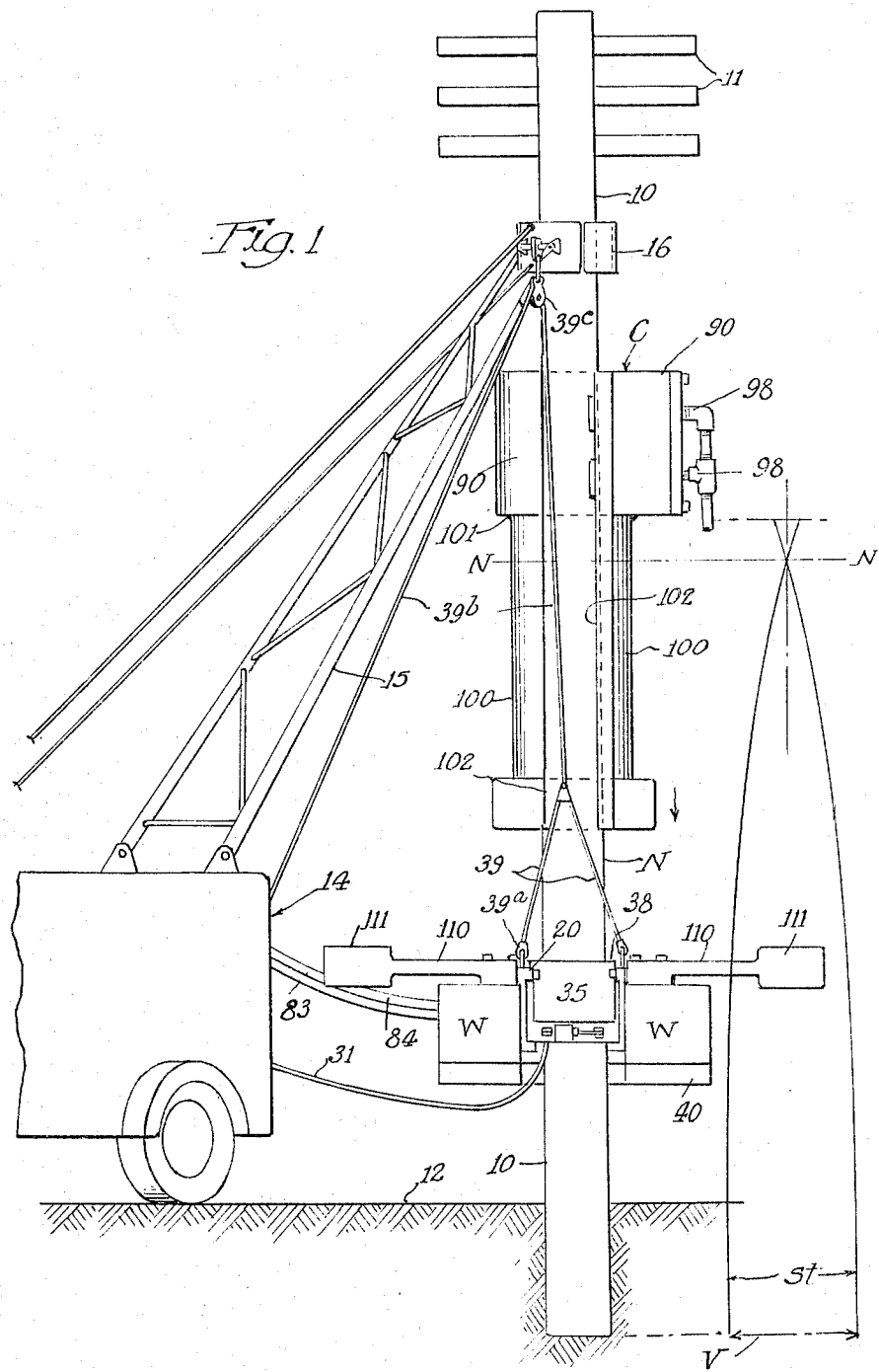
FIG. 1 is an elevational view of a utility pole which has been planted in the earth in accordance with the invention, the view showing also, in elevation, the sonic equipment employed in the driving of the pole, and also certain typical standing wave diagrams of vibration amplitudes along the pole and along a portion of the driving equipment.

In the drawings, there is indicated generally by the reference numeral 10 a common wooden utility pole having cross-arms 11, which has been planted in the ground 12 to usual depth by the process and apparatus of the invention. Clamped to the pole 10, a short distance above ground level, is the sonic wave or vibration driving machine 13 of the invention. To one side of the pole is a conventional vehicle 14 such as is now used in pole planting operations of the conventional sort, and this vehicle 14 is shown as provided with the usual boom 15 carrying at the top a pole-encircling collar 16, understood to comprise two hinged sections which may be opened and then closed about the pole, often being controllably held closed by hydraulic pressure. These particular parts of the equipment, being old and conventional, need not be more than conventionally indicated in the drawings and will be fully understood by those skilled in the art without the necessity of further description or illustration. Suffice it to say the the boom 15 may be lowered to pick up the pole resting at ground level, the collar 16 manipulated to close around the pole, which it surrounds loosely, and the boom 15 may then be swung upwardly to lift the pole. The pole may be carried in vertical position by allowing the collar 16 to engage the lowermost cross-arm 11. The pole may actually be transported over the ground, carried in such a position, that is to say, hanging vertically from the collar 16, which is engaged with the lowermost cross-arm. By this means, the pole is manipulated into a position at which it may be lowered so that its butt end rests at the point at which it is to be driven into the ground. The collar 16 may then be caused to slide downwardly somewhat on the pole, as to the elevation illustrated in FIG. 1, vehicle 14 being manipulated as necessary to accomplish this purpose. The collar 16 continues to support the pole in vertical position, and functions as a guidance means while the pole is driven. The pole is then ready for driving, and the sonic machine 13 is at this time brought into position and clamped to the pole. To this end, the sonic machine 13 may be gripped at a suitable location thereon by the jaws of a conventional front-end loader vehicle of conventional type (not shown), and carried thereby to the pole. Conveniently, the jaws of such machine may be of the type capable of vertical travel on the loader vehicle, so that the sonic machine 13 may be picked up, elevated, and positioned at the pole at a proper elevation for driving. In general, the sonic machine should ordinarily be placed as low as conveniently possible on the pole, consistent with the requirement that the machine must still be above ground level, and capable of again being easily picked up, after the pole has been planted.

A specific embodiment of the sonic driver machine 13, shown in the drawings as illustrative of one form which the invention may take in practice, will now be more particularly considered. It includes a U-frame 20 adapted to surround the pole 10, with clearance as indicated at 21 in FIGS. 4–6. The U-frame 20 is formed with an internal groove or way 22, which receives or fits onto the two arms 23 of a clamp 24 which is preliminarily engageable with the pole 10 at selected height above ground level. The two arms 23 are hinged to one another, as at 25, and are arcuately formed in conformation to the circumference of the pole 10. Together, they may embrace a little less than the full circumference of the pole, as seen best in FIG. 4.

In accordance with the illustrative embodiment of the invention, the clamp 24 is applied to the pole first, and the rest of the sonic vibration generator machine engaged with the clamp afterwards. Accordingly, the clamp 24, with its arms 23 swung apart, is elevated to the proper height (e.g., hand-fitted), and then closed on the pole. The arcuate inside surfaces of the clamp arms are formed with serrations 26 for good, non-slip engagement with the pole. The clamp further furnished with means for forcing the clamp arms into very firm, non-slipping clamping engagement with the pole; and to this end the clamp arms 23 may be provided, adjacent hinge 25, with arms 27, to which are pivotally connected a pair of rods 28 and 29, of which rod 28 carries a hydraulic cylinder 30, and rod 29 a piston (not shown) in cylinder 30. A hydraulic line 31, extending from a controllable pressurized source (not shown) located on vehicle 14, conducts hydraulic fluid into cylinder 30 to expand arms 27 and thereby effect closure and tight clamping of clamp arms 23 about the pole. To release the clamp from the pole, the pressure fluid in line 31 is cut off from its pressure source, using for this purpose a suitable control valve (not shown) which not only shuts off the source of pressure fluid from the line leading to cylinder 30, but connects said line to "return," so as to exhaust pressure fluid from the cylinder, as is common in hydraulic systems servicing cylinder- and piston-type fluid motors. Obviously, if desired, pressure fluid could subsequently be fed into the opposite end of cylinder 30, and the clamp arms 23 thereby positively swung apart. It will usually be convenient, however, to spread the clamp arms apart manually once the pressure in line 31 has been relieved, and the sonic machine has been removed from the clamp.

Thus, to summarize briefly, the first step in the preferred practice of the present process is to place the pole in a vertical position, with its butt end resting on the ground at the point at which it is to be "planted." The next step comprises the engagement of the clamp 24 with the lower end portion of the pole, at a sufficient elevation that the sonic driving machine (which is to be engaged over the clamp) will clear the ground surface sufficiently as to be still above ground level when the pole has been sunk to the fully driven position illustrated in FIG. 1. In engaging the sonic machine with the clamp, the machine, understood to be supported by any suitable lifting equipment, preferably a front-end loader of the conventional type mentioned hereinabove, is positioned at the proper elevation, and then so moved, horizontally, that the U-frame 20 slides on over the clamp, the pole thus becoming positioned inside the arms of the U-frame. To assure retention of the U-frame in its proper engaged position with the clamp, an arcuate block 35 (see FIGS. 1 and 7) may be inserted between the extremities of the arms of the U-frame after the latter are around the clamp and pole, behind or inside a pair of positioning abutments 36, and with its arcuate surface 37 in opposition to the clamp. This block 35 may have a shoulder 38 at the top to overhang a portion of the U-frame and thus be vertically supported thereby.

In lieu of the front-end loader, referred to hereinabove, the sonic machine may be transported to the foot of the pole by any other means desired. It can then be elevated, as by a sling 39 connected to eyes 39a set in U-frame 20, and a line 39b extending over a block 39c carried by collar 16. So elevated to proper height, the sonic machine may easily be manipulated into proper engagement with the clamp 24 which has previously been set onto the pole.

The sonic machine 13 further includes, at a level a few inches below U-frame 20, a U-shaped platform 40, suspended from U-frame 20 by spring devices 41, more particularly described hereinafter, and whose U-shaped slot or opening 42 is oriented in correspondence with the frame 20, so that the U-frame 20 and U-platform 40 may be moved "onto" the pole together. The spring devices 41 might be simple helical tension springs, though I prefer and here show springs of an air-cushion type. Thus, a plurality of pneumatic cylinders 44 (FIG. 5), here four in number, are suitably secured at spaced points to the U-frame 20, and working in these cylinders 44 are pistons 45, to which are connected piston rods 46 extending downwardly and secured at their lower extremities to the platform 40. Air under suitable pressure is introduced to the lower ends of the cylinders 44 via air hoses 48, and the upper ends of the cylinders may be vented to atmosphere, as by ports 49. Air is supplied to air hoses 48 from a suitable pressurized source of supply (not shown), and it will be understood that the pressure of this air is regulated to support the pistons 45 normally in an intermediate position in the cylinders 44, as shown, so as to permit a substantial degree of vertical vibratory movement of the cylinders 44 with U-frame 20 without danger of engagement of the pistons with the ends of the cylinders. Air pressure regulating devices suitable for this purpose are known and need not be disclosed herein.

This U-shaped platform 40, as thus described, mounts at the back a suitable motor 50 for driving a sonic wave generator generally designated by the number 51, and which will be presently described, and it mounts also, on its two extremities, a pair of counterbalancing and bias weights w. Thus the motor 50 is counterbalanced by the weights w, and the motor 50 and weights w constitute a gravity load on the platform 40. The weight of these units plus the weight of the platform 40 is suspended from the relatively massive U-frame 20, which is in turn engaged with the clamp 24 set onto the pole. It will be appreciated from the scale of the drawings that the components mentioned are relatively massive in character, and act to impose a relatively heavy downward bias loading force on the pole at the point of clamping by the clamp 24. As will appear, the weight of the presently described sonic wave generator is added to and becomes a part of the bias loading.

The sonic wave generator 51 is of a general type first disclosed in my prior application entitled Vibration Generator for Resonant Loads and Sonic Systems Embodying Same. Ser. No. 181,385, filed on Mar. 21, 1962, now Patent No. 3,217,551. This generator is disclosed in the present application in a somewhat simplified and diagrammatic fashion. For a more complete and detailed disclosure of a preferred form of the generator, the application referred to should be consulted.

As here shown, the generator 51 is separated into two separate but identical units 51a and 51b, synchronized and cooperating with one another. The two units 51a and 51b each embody an exterior housing 52, and these two housings are secured, as by studs 52a (FIG. 5), to opposite legs of U-frame 20. Each housing 52 comprises an intermediate cylindrically bored body member 53, with its bore 56 horizontal and parallel to the corresponding leg of the U-frame, together with opposite end plates 54 and 55. The bores 56 in body members 53 contain inertia rotors designated generally by the numeral 57, and constitute raceways for said rotors. Each such rotor 57 embodies an inertia roller 58, of somewhat less diameter than the corresponding raceway bore 56, and which is rotatably mounted on an axle 62 projecting axially from the hub portion of a spur gear 64. The pitch circle of this spur gear 64 is of substantially the same diameter as the roller 58. Gear 64 meshes with an internal gear 65 mounted within housing body 53 concentrically with the corresponding raceway bore 56, and whose pitch circle is substantially of the same diameter as said bore.

Each rotor 57 is designed to move in an orbital path about its raceway bore 56 as a guide, with gear 64 in mesh with internal ring gear 65, and with inertia roller 58 rolling on the bearing surface afforded by the raceway bore 56. To maintain the roller 58 in proper engagement with the raceway 56 while the generator is at rest, or coming up to speed, the axle 62 of the rotor is provided with an axial pin 66 which rides around a circular boss 67 projecting inwardly from the side wall or end plate 55 on the axis of the raceway bore 56.

The two rotors 57 are driven through a pair of driveshafts 74, each of which has a universal joint coupling 75 to the corresponding spur gear 64. The shafts 74 are connected through universal joints 76 to shafts 77 journalled in bearings 78 supported from platform 40, and shafts 77 carry bevel gears 80 meshing with bevel gears 81 on the driveshaft of motor 50 mounted on platform 40. While this motor 50 may be of any type, for example electric or hydraulic, I prefer and here indicate a hydraulic motor, and motor 50 is here shown as having intake and exhaust pipes 83 and 84 for hydraulic drive fluid furnished under pressure, and exhausted to "return" employing hydraulic equipment of conventional nature and which need not be further illustrated. It is, however, desirable that the hydraulic equipment, which incidentally is conveniently supported on the transport vehicle 14, be equipped with means for varying the flow rate through the hydraulic motor 50, so as to permit adjustment of the drive speed of the rotors 57 to find and operate at the frequencies for resonance for any given utility pole to be driven. The hydraulic source equipment may thus, for simple example, include a means for providing a source of hydraulic liquid at a given elevated pressure, and control valve means by which this source fluid is supplied to hydraulic motor 50 at any desired pressure and flow rate, as well as turned on and shut off at will. Resonance may then be readily attained by simple regulation of the fluid flow rate to the motor by means of this control valve means.

Figure 6:
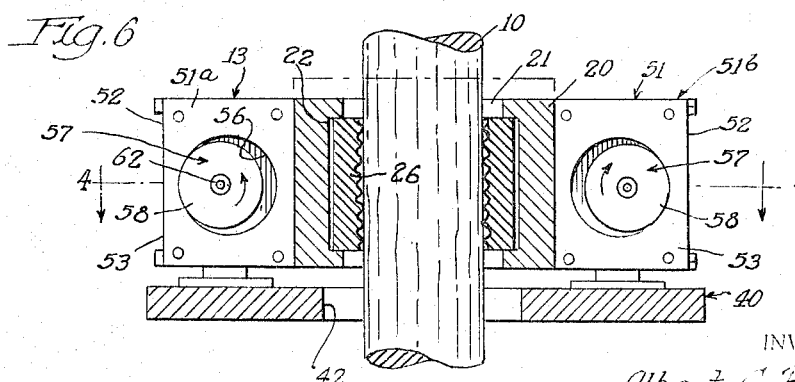
FIG. 6 is a section taken on line 6—6 of FIG. 4.

The operation of the sonic vibration or wave generator comprised of the two intercoupled and commonly driven units 51a and 51b is as follows: An inspection of FIG. 4 will readily disclose that the two driveshafts 74 are driven in opposite directions by the drive motor 50. The shafts 74, thus driven in opposite directions, drive the two spur gears 64 in opposite directions around the internal gears 65, the two shafts 74 each moving in a conical gyratory fashion. The inertia rollers 58 roll on the bearing surfaces 56, so that the rotors 57 move in orbital paths about the raceways 56. The centrifugal forces developed by the rotors moving in these orbital paths results in exertion of pressure of the rollers 58 on the surfaces of the raceways 56. The rollers 58 turn at nearly the same rate of rotation as the gears 64, with any slight variation or creep therebetween accommodated by the rotatable mounting of the rollers 58 on gear shafts 62. The two inertia rotors, by reason of their centrifugal forces, thus exert gyratory forces on the housings 52. The rotors 57, however, are so phased that the vertical components of their motions are always substantially or nearly in phase or in step with one another, while the horizontal components of their motions are correspondingly opposed. This is accomplished in the original setting of the rotors by means of the interconnecting gearing. For example, as shown in FIG. 6, the rotors may be set so that they are at their extreme outermost positions simultaneously with one another. A slight modification of this arrangement will be mentioned presently, but for now, assume that the rotors reach their extreme outermost positions, as shown in FIG. 6, coincidentally. The rotors will then be seen to move horizontally with equal or opposed movements, and a little reflection will show that the horizontal components of the centrifugal forces exerted thereby on the housing 52 are equal and opposed and cancel within the housings 52 and the interconnecting U-frame 20. On the other hand, as may readily be seen, the gyrating rotors move vertically in step with one another, so the vertical components of the centrifugal forces exerted against the housing 52 are equal and in phase, and are therefore additive in a vertical direction. And since the housings 52 are rigidly connected to opposite sides of the U-frame 20, these housings exert on the U-frame 20 vertically oriented alternating forces which are in phase with one another. A single resultant vertically directed alternating force is thereby exerted from U-frame 20 through clamp 24 to the lower end portion of the pole 10 to which the clamp has been applied.

It will be observed that the type of the wave generator disclosed has a desirable frequency step-up characteristic from drive motor input to vibratory output force applied to the pole, and that for each orbital trip of a given gear 64 and its corresponding inertia roller 58 around the inside of internal gear 65 and raceway bore 56, the shaft 74, gear 64 and roller 58 make only a small fraction of a complete revolution on their own axes. The shafts 74 thus gyrate in their conical paths at greater frequency than their own rotational frequency on their own axes. Thus the orbital frequency of the inertia rotors 57, and the vibration output frequency of the generator housings 52, are correspondingly multiplied over the rotational frequency of the driveshafts 74. High vibration frequencies are thereby achieved without the use of high-speed motors, or large gear ratios between the motor and the vibration generator. A simple, low-speed drive motor may thus be used, and a vibration of high output frequency, such as will create a resonant standing wave in the utility pole, obtained therefrom in a simple manner.

The sonic wave or vibration generator, or oscillator, comprised of the two synchronized units 51a and 51b, is driven at a controlled speed to generate its output alternating force at a frequency such as will set up a predetermined longitudinal elastic standing wave pattern in a selected length of the pole, extending from the bottom end of the pole up to a predetermined point, typically as represented in FIG. 1, rising to a level above the longitudinal center of the pole. To confine the standing wave pattern to this predetermined length of the pole, a secondary sonic circuit element, as referred to hereinabove, is clamped to the pole just above this predetermined length.

In the illustrative embodiment here shown, the secondary sonic circuit element embodies a mass element 90, composed of steel, and of relatively large mass as compared to the mass of the pole. Considering its function in the sonic circuit, the mass element 90 may be regarded as a large, mass reactive impedance element, or mass reactor. The mass element or reactor 90 is formed substantially into a U-shape, as seen in plan (FIG. 3), and is adapted to be moved laterally onto or around the pole 10. Combined with this mass element 90 is a pole clamp C. Thus, in the present embodiment, one leg 91 of the U-shaped mass 90 has, on the inner side of said leg, arcuately formed teeth or serrations 92 adapted to make biting engagement with one side of the pole 10. The opposite side of said pole, in an area immediately opposite to the serrations 92, is engageable by arcuate and correspondingly formed serrations 93 on two hydraulic clamp plungers 94 and 95 working in hydraulic cylinders 96 formed in the somewhat thickened other leg 97 of the U-shaped mass 90. Hydraulic fluid under pressure admitted via lines 98 to the chambers in front of the clamp plungers 94 and 95 forces the latter inwardly against return springs 99, so as to forcibly engage the pole, the serrations 93 making good biting engagement with the latter. The relatively heavy mass element or member 90 is thus clamped tightly to the pole 10, so that it will not be displaced by the vibratory action in the portion of the pole below it. As stated hereinabove, the point of clamping engagement of the mass element 90 with the pole is preferably above the center of length of the pole, so that normally there is substantially more distance from the mass 90 down to the lower extremity of the pole than from the mass 90 up to the upper extremity thereof. This, however, is advantageous, for reasons given hereinabove, but not an essential practice of the invention.

As a preferred but optional feature of the invention, there is added at the clamp C, a resonating appendage which is tuned to the frequency of vibration set up in the pole, and which, at resonance, presents a high bucking impedance at the clamp. This device is analogous to a resonant electric circuit consisting of a capacitor and inductor connected in parallel, in that it looks to a source of vibrations at the resonant frequency as a very high impedance, ideally an infinite impedance.

This device is illustratively shown as a primarily distributed constant acoustic circuit element, in this example, in the physical form of an elastic longitudinally vibratory steel jacket 100 around the pole 10, depending from the mass element 90, being in this case welded to the underside of the latter, as indicated at 101. In the event of the mass element being reduced in bulk until it can no longer be regarded as a "lumped" mass, the leg or jacket 100 can then be regarded as fixed to and depending from the clamp C. This jacket member 100 is open along one side, as appears in FIG. 1, so as to afford a gap 102 permitting the jacket 100 to go on around the pole 10 at the same time that the U-shaped mass element 90 is engaged therewith. The jacket member 100 is preferably simply a generally cylindrical member or sleeve, disposed around the pole 10 when the clamp C is clamped onto the pole, and with an opening 102 along one side just wider than the diameter of the pole. The jacket or sleeve 100 is here shown and is preferably formed at the lower end with a thickened portion or collar 104 to afford a degree of lumped mass at that point, thereby contributing the effect of a shortening of the sleeve 100 and of the standing wave pattern therealong for a given frequency. The complete operation of the system will be described in more particular hereinafter, but it may at this time be explained that in operation, as indicated hereinabove, a longitudinal resonant standing wave pattern is established in a lower portion of the pole, i.e., below the mass element 90, and such a standing wave pattern is designated in FIG. 1 at $st$. This standing wave pattern is characterized by a velocity antinode V at the lower end of the pole, and a stress antinode $or$, which amounts to the same thing, a velocity node N, at a point usually a short distance below the mass element 90 if this mass element alone is used, or usually right at the clamp C if the optional tuned element 100 is used. The distance from velocity antinode V to velocity node N is a quarter wavelength, as will be seen. The resonant frequency which must be delivered by the oscillator to establish this resonant standing wave pattern is given by $S/4L$ where S is the speed of sound in the material of the pole and L is the length of that portion of the pole from the node N to the lower end. Accordingly, to establish the desired standing wave pattern, the oscillator or vibration generator is driven at the resonant frequency defined by $S/4L$. As will be appreciated by those skilled in the art, the portion of the pole from the node N to its lower end will under these conditions alternately elastically shorten and elongate, the amplitude of such vibratory motion being diagrammatically represented at any point on the pole by the width between the two curved lines of the standing wave diagram $st$. The mass element 90, clamped to the pole 10 just above the node N, may be caused by the standing wave vibration in the pole below it to vibrate minutely, but the amplitude of this vibration can be made very small. This vibration amplitude would be zero, and the note would be right at the clamp, if the element 90 possessed infinite mass. It would also be zero if the bucking impedance presented by the clamped-on out-of-phase resonant vibratory structure 100, either by itself, or together with the impedance of the mass element 90, exactly balanced the impedance of the pole at the effective clamping point. This performance will be further described hereinafter.

As a further preferred but optional feature of the invention, I show the use of resonant, frequency-responsive elastically vibratory devices, having elastic compliance reactance at the oscillator frequency for bucking or tuning out the mass reactance of the oscillator body, thereby, first, doing away with the force wastage otherwise involved in vibrating the oscillator body masses, and, second, reducing the reactive impedance of the resonantly vibratory portion of the pole, such that the demands upon the secondary or vibration isolation portions of the acoustic circuit are correspondingly reduced. The oscillator is divided in the illustrative embodiment into two units 51a and 51b. On each of these, according to the illustrative embodiment of the invention, is mounted one end of a laterally vibratory elastic reed 110, vibrating in a vertical plane. Each of these reeds 110 comprises a laterally flexible steel arm, terminating at its free end in a lumped mass or weight 111. Vertical vibration of the oscillator body or housing sets these reeds into vibration, and they are tuned so as to resonate in the standing wave pattern $p$ as indicated in FIG. 2, in response to vertical vibration of the oscillator housing. They are tuned to resonate at the frequency of the oscillator, and are designed, by techniques familiar to those skilled in the art, to have elastic compliance reactances which will substantially equal and cancel the mass reactances of the oscillator bodies. The functions of the weights 111 on the ends of the reeds will be understood to be simply to afford the reeds with lumped masses and thereby shorten their necessary length for the resonant frequency of the apparatus, which length would otherwise be awkwardly long. Thus the mass reactance of the oscillator bodies is counteracted, and the force otherwise consumed in vibrating them is conserved and remains available for vibrating the pole. Also, the mass reactive impedance of the vibrating portion of the pole is greatly reduced, and the problem of bucking or counteracting this impedance within the vibration isolation portions of the acoustic circuit is reduced correspondingly.

The process of the invention begins with the hoisting of the pole into an erect position, using hoisting and guidance equipment such as illustrated in FIG. 1, the pole being positioned with its butt end resting on the ground at the point at which it is to be planted, and the guiding collar 16 being lowered somewhat below the cross-arms, so that it will not be engaged by the latter in the driving of the pole. Pole clamp 24 is then engaged with the pole, well towards the lower end of the pole, and well below the predetermined position of the nodal point N, while being above the level to which the pole is to be driven. The pole clamp 24 is set tightly, and a non-slipping grip obtained, as described in my aforesaid application Serial No. 228,085.

The sonic vibration generator machine is then engaged with the clamp 24 and the pole. It was earlier described how this could conveniently be done by use of a front-end loader, or fork-lift vehicle. Assuming use of such a vehicle, and assuming such vehicle to be provided with conventional gripping jaws for the work to be carried, such jaws may be adapted for gripping engagement with the platform 40 at the two sides of the drive motor 50. The loader vehicle may thus carry the sonic machine to the location of the pole. The gripping jaws of the loader vehicle are then elevated until the U-frame 20 is opposite the clamp 24, whereupon the machine is engaged with the clamp and the pole, the clamp being received in the way 22 of the U-frame 20. The closure block 35 may then be inserted, and the front-end loader vehicle disengaged from the sonic machine and backed away. Alternatively, the loader vehicle might remain engaged with platform 40, and the elevator mechanism for the jaws manipulated in such fashion as to elevate the front wheels of the vehicle off the ground, thus allowing a large portion of the weight of the vehicle to hang from the platform 40. This additional weighting of the apparatus can afford a convenient means for adding a large extra amount of downward biasing weight through the apparatus to the pole.

The U-shaped mass element 90, together with the vibratory jacket or sleeve 100, if the latter is used, is then clamped onto the pole just above the region selected for the node N, and preferably, for reasons already given, well above the center of length of the pole.

Oscillator motor 50 is then driven, and causes operation of vibration generator units 51a and 51b to set up a condition of vertical alternating force application to the generator housings, the U-frame 20, the clamp 24 and the pole at said clamp. This force application to the pole results in setting up of cyclically repeated compressional wave transmission in first one direction and then the other along the pole. These waves will be reflected in the region of the clamp C, because of the influence of either or both of the mass element 90 and the out-of-phase vibratory compliance structure 100. As is well understood, downwardly traveling waves are reflected from the bottom end of the pole, and the waves delivered from the generator and reflected, as indicated, reinforce and interfere with one another in a characteristic manner, well known to those skilled in the acoustic art. If the frequency of the alternating force delivered from the oscillator is a resonant frequency for the length of pole involved in the wave path, and the particular velocity of sound in the material of the pole, a resonant standing wave is created, as represented at $st$. The finding of the proper operating resonance frequency for the desired standing wave performance is very simple. The operator simply controls the speed of the drive motor until he finds the region at which vibration amplitude is maximized, and it is a very simple matter, in practice, to set the operation near peak vibratory amplitude, which is a condition denoting attainment of the desired resonant condition. When the conditions described in the foregoing have been attained, the butt end of the pole is not only pressed firmly against the ground by reason of its own weight and of the loading of the various parts clamped onto it, but is also sonically vibrated against the ground at the resonant frequency of the sonic wave or vibration pattern set up in the lower vibratory portion of the pole. Under this combination of influences, the soil under the pole becomes agitated, loosened and fluidized, and moves out of the way to permit the pole to sink itself into the soil. This performance takes place rapidly, and while the soil originally under the pole is readily and rapidly broken up, fluidized and moved laterally, it is also compacted laterally, so that when the vibration is discontinued, the soil immediately surrounding the pole is highly compacted and affords very good support for the pole. The process is continued until the predetermined lower end portion of the pole, a minor fraction of its total length, has been buried, and is then sharply interrupted, all as discussed more fully in my aforementioned earlier application Serial No. 228,085.

Returning now to a consideration of the sonic circuit means provided by the present invention for isolating the upper portion of the pole from the vibration in the lower portion thereof, attention is directed first to the mass element 90, combined with the clamp C, with the resonant structure 100 for the time being ignored, or considered to have been omitted. The mass element 90 is of large enough mass to create a point of high impedance in the portion of the pole to which it is clamped, such that vibratory amplitude at this mass element is reduced to a minor or immaterial magnitude, and the pole above, together with the parts at the top end, remain desirably quiescent for whatever purpose is in hand. The high impedance region of the pole established by the clamped-on mass 90 fixes the nodal point N at or adjacent to this mass (FIG. 1); and makes possible the wave reflection and interference phenomenon referred to hereinabove, according to which a resonant wave pattern can be established in the lower portion of the pole, while the upper portion thereof remains relatively quiescent.

Assume next that the mass element 90 is employed, and that the resonant vibratory structure 100 is used therewith. The mass element 90 again contributes high impedance to the pole at the point of clamping. In addition, however, the sleeve or jacket structure 100 participates in the acoustic standing wave pattern, as represented in the standing wave diagram forming a portion of FIG. 2, and furnishes large additional impedance to the pole at the clamped point, whereby this impedance can be made to approach closer to or to equal infinity, and the pole length and structure above quieted still further.

In this case, a node N' is established practically at the clamp, as earlier described, and the compressional sound wave travels to this node N' at the mass 90, and is there reflected as a compressional sound wave which then travels down the elastic sleeve or jacket 100, to be reflected upwards from the lower end thereof, and thus to result in reinforcement and interference phenomena, as in the pole. The length of the jacket 100, taking into account its lumped mass at 104, and the velocity of sound in steel, is made such that a resonant acoustic circuit is formed, comprised of the pole from the lower end to the clamp, the mass 90, and the elastically vibratory jacket or sleeve 100, so that the resonant standing wave pattern $st$ extends from a velocity node at the bottom end of the pole to the mass 90, and then, with reflection at the mass 90, down the jacket to its lower end, as represented at $s't'$. The portion $s't'$ of the over-all pattern is approximately a quarter wavelength long, with some shortening, however, owing to the lumped mass 104. The sleeve 100 then has a velocity antinode V' at the lower end, and it elastically elongates and contracts in step with the elastic deformations in the pole, but with 180° phase reversal, such that the pole length up to the clamp is elastically elongating while the sleeve 100 is elastically contracting, and is elastically contracting while the sleeve is elastically elongating. These performances counteract one another, and with ideal design, the momentums in the two members are always equal and opposed, so that complete cancellation is attained, and no vibration leaks upward into the upper portion of the pole. This ideal condition represents a theoretical condition of infinite impedance in the pole at the node. In the preferred practice of the invention, a large proportion of the desired high impedance is contributed by the mass 90, and another large proportion thereof by the out-of-phase vibratory or impedance bucking structure 100. In this connection it will be seen that considerable latitude is allowed within the broad scope of the invention. The mass 90 may be very large, in which case the sleeve 100 need not present so much bucking impedance and may be lighter, or may even, in some cases, be omitted. In this case, the node is located somewhat down from the clamp C. At the other extreme, the sleeve 100 may be made large and robust, and of high impedance, and the mass 90 may then be smaller, or even, at the extreme, may be omitted. In this case, the node is higher up, and at the extreme is within the clamp.

FIG. 8 is a view similar to FIG. 6, and shows the two rotors 57 of the sonic machine of FIGS. 1-6 to have been given a phase change of 180° as compared with the arrangement as earlier described. That is to say, the inertia rotors again rotate in opposite directions, but instead of moving equally and oppositely in the horizontal direction, they move horizontally in unison, and vertically in opposition to one another. Accordingly, a lateral instead of a vertical alternating force generated and applied to the pole, and a lateral wave is propagated vertically along the pole. This force and resulting wave may be regulated in frequency to approximate the frequency of a predetermined lower selected pole length for a lateral standing wave resonant performance, so that a lateral wave can be obtained rather than a longitudinal wave. In such case, a clamped-on mass element, such as the mass element 90 of FIG. 2, will again establish a nodal point such as N of FIG. 2, but this time for a lateral wave. The mass reactance provided by the mass element 90 again produces quiescense in the pole above the clamped-on mass. A structure equivalent to that of the sleeve member 100 may be added to the mass element, provided it be designed for lateral vibration in response to vibratory influences reaching the mass member 90, and provided it be tuned to the resonant operating frequency, equivalently to the longitudinal wave system previously described.

Figure 4:
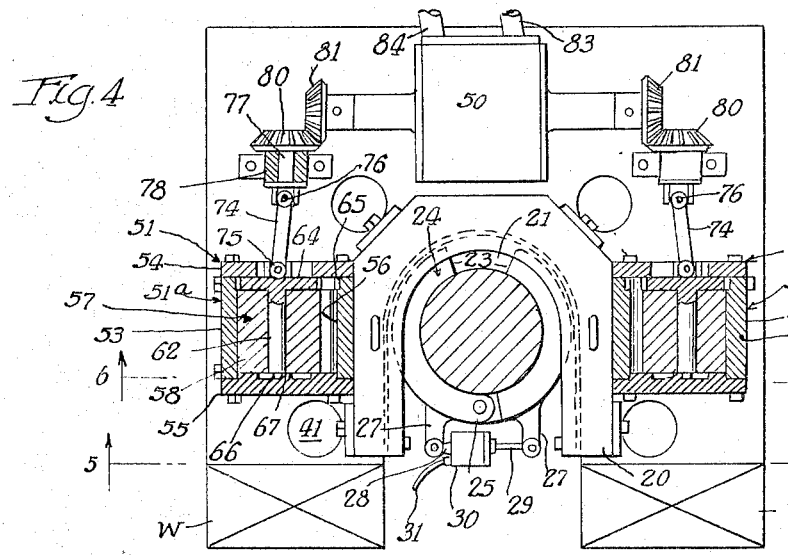
FIG. 4 is a plan section taken in accordance with line 4—4 on FIG. 6.
Figure 5:
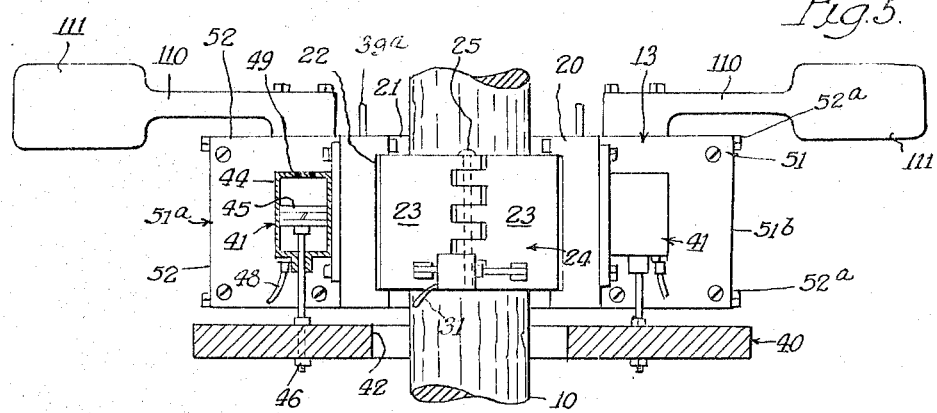
FIG. 5 is a section taken on line 5—5 of FIG. 4.

FIG. 9 is a view similar to FIG. 4, with corresponding parts identified by like reference numerals, but showing a modification by which there is applied to the pole a longitudinal wave, a lateral wave, and also a torsional wave. Any one of these can be caused to predominate by controlling the drive motor to operate the generator at the resonant frequency for the selected wave mode, longitudinal, lateral or torsional. According to this modification, the rotor 57a for one generator 51a' is made to be of half the width of the rotor 57b of the other generator 51b' with the entirety of the mass of rotor 57a of generator 51a' on one side of a plane drawn perpendicular to the rotor and through the central vertical axis of the pole. The rotor 57b of the generator 51b' is bisected by said plane. Considering the longitudinal wave mode, the two inertia rotors of the two generators will cooperate to produce such a wave at the longitudinal resonant frequency of the pole. The wave will not be as strong as though the short rotor 57a were of full length, but will still be of substantial strength. The shortened rotor 57a will only balance half the lateral force component from the rotor of the generator 51b' of the other side so that, in this case, a lateral standing wave is also set up in the pole. To cause the latter to predominate, and the longitudinal wave mode to be subdued, it is only necessary to change the speed of drive of the motor 50 to attain a frequency in the range of resonance for the lateral wave mode. Under these conditions, the longitudinal wave action will thus be diminished in magnitude, and the lateral wave action emphasized.

Finally, the arrangement disclosed in FIG. 9 results in a torsional component of vibration, in addition to the longitudinal and lateral components mentioned above.

It will be seen that the half-length inertia rotor 57a, which is on one side of a vertical plane perpendicular thereto and passing through the vertical centerline of the pole, exactly balances the portion of the full-length inertia rotor 57b (of generator 51b') which is on the same side of said plane, insofar as torque effects about the axis of the pole are concerned. The half of rotor 57b which is on the other side of said plane, however, is not so balanced, and the centrifugal force component of this half of rotor 57b acts alternately along an effective horizontal thrust line passing to one side of the pole axis. A cyclic torsion is thereby created, and by setting the speed of operation to approximately that for the resonance for the torsional mode of standing wave vibration, a pronounced torsional mode of vibration will be attained, with longitudinal and lateral wave nodes at lesser magnitude.

The lateral or torsional modes, whose standing wave patterns are of reduced length as compared with the longitudinal wave mode for a given frequency, are particularly useful for short poles, or metal anchors or the like, all of which are broadly and generically included herein within the meaning of the word pole.

Although I do not want to be held by this theory, I believe I have strong theoretical explanations for the unique sonic fluidization effect which accrues when resonance is employed. Apparently the sonic action results in a very unique performance in granular media such as earthen soils. This is to be contrasted with devices which simply bodily vibrate a member against the earth.

In such bodily vibration arrangements the earth must present a vibratory response to the bodily vibrating member. This is because the bodily vibrating member is only one element of a vibration system. It does not provide the complete circuit response within itself. Therefore the earth necessarily must provide a capacitative response, sometimes in combination with additional inductive response. At any rate, since the earthen material has to provide a particular discrete response, it necessarily follows that a substantial region of the earth vibrates as a unitary body. This of course is in the region immediately around the bodily vibration member which is being inserted into the earth. Since the bodily vibration member is a single unit, vibrating with a single discrete vibratory motion, the region of the earth therearound must vibrate also with a single vibratory motion, in order that the earth present the above described response characteristic. It is of course obvious that no individual grain nor small group of small grains can present sufficient force of response in relation to a substantially sized bodily vibratory member. Accordingly it follows then that the earth must present this response throughout a substantial volume of the earth surrounding the vibratory member. In order to do this the earthen grains in this region of the earth vibrate substantially in unison, all moving in substantially the same phase and direction, as well as with substantially the same amplitude. This then tends to have the earthen material still behave as a fairly coherent mass, which is difficult to penetrate.

With my resonant sonic system, on the other hand, all of the responses are embodied within resonant structure itself. In other words, my resonant system is of itself a fully complete resonant circuit. All requirements of inductance and capacitance are fully met by the structure. This structure might be a resonant pile member, or a pile member which resonates in combination with other response structure attached thereto. The important point is that under such conditions, the earth seems to know what is going on, and nature then does not require that the earth present any kind of reactive impedance response. This means then that the earth need provide only a resistive impedance. Under such latter conditions the earthen grains tend to vibrate randomly, being fully random as regards relative vibration between the grains. These grains can vibrate randomly relative to each other as regards direction, phase, and amplitude. This results in considerable relative motion and freedom of mobility between the separate grains, with the result that they can be displaced and compacted quite easily relative to each other. Accordingly, with a moderate amount of bias, such as a force pressing the penetration member in a given direction, these grains can be made to "wiggle" inbetween each other, so that they tumble around and fit closely finally in a compact mass, with the various odd-shaped grains tending to line up for maximum compaction, and with the small grains fitting inbetween the big grains. The result then is that the sonic activation makes possible a very high degree of mobility and resulting compaction, so that the penetration members can progress with great facility into the earth.

It will be understood that the improvements of the present invention are applicable with use of the modified generator arrangements disclosed in FIG. 9. In all cases, the use of a mass reactive element, such as the element 90 of FIGS. 1 and 2, will establish a node and a lower length of pole within which a standing wave vibration may take place, while isolating the upper portion of the pole from such vibration. Auxiliary devices analogous to the out-of-phase bucking impedance device 100 may clearly be added, or used without the reactive mass, as desired.

It will be understood that the drawings and description of certain present forms of the invention are for illustrative purposes only, and that various changes in design, structure and arrangement may be made without departing from the spirit and scope of the invention or of the appended claims.

I claim:

1. A system for planting a pole into the ground to a predetermined depth which is a minor fraction of its length, said pole being of an elastic material, so as to permit an elastic standing wave to be set up therein, characterized by a velocity antinode at its lower extremity, and at least one stress antinode thereabove, that comprises:
- means for supporting the pole in a predetermined position with its butt end in engagement with the ground and forced thereagainst;
- a sonic wave generator clamped to and supported by the pole at a point therealong spaced below said stress antinode and spaced above the point on the pole which is to be driven to ground level, said generator being adapted for setting up in the pole an elastic standing wave as aforesaid; and
- a mechanical sonic impedance element clamped to said pole in the region of said stress antinode.

2. The system of claim 1, wherein said impedance element has a mass reactance.

3. The system of claim 1 wherein said impedance element includes a vibratory resonant appendage having a resonant frequency in the region of the frequency of the standing wave set up in the pole by said sonic wave generator, said resonant appendage presenting a high impedance in the region of clamping of said impedance element to said pole.

4. The system of claim 1, wherein said generator includes a resonating appendage coupled to said generator.

5. The subject matter of claim 1, wherein said mechanical sonic impedance element has a mass reactance and includes a lumped mass element clamped to said pole in the region of said stress antinode.

6. The subject matter of claim 5, wherein said mechanical sonic impedance element includes also an elastically vibratory structure having a resonant frequency in the region of the frequency of the standing wave set up in the pole by said sonic wave generator.

7. The subject matter of claim 6, wherein a longitudinal standing wave is set up in said pole, and said resonant elastically vibratory structure vibrates longitudinally of the pole.

8. The subject matter of claim 7, wherein said resonant elastically vibratory structure is primarily of a distributed constant character, so as to vibrate in a longitudinal standing wave mode.

9. The subject matter of claim 1, wherein said sonic impedance element includes an elastically vibratory structure having a resonant frequency in the region of the frequency of the standing wave set up in the pole by said sonic wave generator.

10. The subject matter of claim 9, wherein a longitudinal standing wave is set up in said pole, and said resonant elastically vibratory structure vibrates longitudinally of the pole.

11. The subject matter of claim 10, wherein said resonant elastically vibratory structure is primarily of a distributed constant character, so as to vibrate in a longitudinal standing wave mode.

12. The subject matter of claim 1, wherein said sonic impedance element is clamped to the pole at a point substantially above the longitudinal mid-point of the pole.

13. The subject matter of claim 9, including a resonating appendage coupled to said generator.

14. The method of planting a pole into the ground to a predetermined depth which is a minor fraction of its length, said pole being of elastic material, so as to permit an elastic standing wave to be set up therein, characterized by a velocity antinode at its lower extremity and at least one stress antinode thereabove, that comprises:
- positioning the pole with its butt end resting on the ground;
- clamping to the pole, at a position spaced below the lowermost stress antinode of the standing wave in the pole, a sonic wave generator capable of setting up in the pole a sonic elastic standing wave as aforesaid;
- operating said generator to set up said standing wave in said pole; and
- clamping to the pole, in the region of said stress antinode, a sonic impedance means which presents at the pole an impedance of the order of the impedance in the region of said stress antinode owing to said standing wave set up in said pole by said generator.

References Cited by the Examiner

UNITED STATES PATENTS

| 2,743,585 | 5/1956 | Berthet et al. | 74—61 |
| 2,867,984 | 1/1959 | Desvaux et al. | 74—61 |
| 2,903,242 | 9/1959 | Bodine | 175—55 |
| 2,975,846 | 3/1961 | Bodine | 175—19 |

FOREIGN PATENTS

| 726,660 | 10/1942 | Germany. |
| 510,064 | 7/1939 | Great Britain. |

CHARLES E. O'CONNELL, *Primary Examiner.*

R. E. FAVREAU, *Assistant Examiner.*